United States Patent [19]

Noguchi et al.

[11] Patent Number: 4,743,516
[45] Date of Patent: May 10, 1988

[54] INTEGRATED POWER PLANT AND METHOD FOR OPERATING THE PLANT

[75] Inventors: Yoshiki Noguchi; Nobuo Nagasaki; Youichi Hattori, all of Hitachi; Kenji Yokosuka, Katsuta; Shigehisa Sugita, Hitachi, all of Japan

[73] Assignees: Hitachi, Ltd., Tokyo; Hitachi Engineering Co., Ltd., Ibaraki, both of Japan

[21] Appl. No.: 52,872

[22] Filed: May 22, 1987

[30] Foreign Application Priority Data

May 23, 1986 [JP] Japan ................... 61-117520

[51] Int. Cl.⁴ ................... H01M 8/06; H01M 8/14
[52] U.S. Cl. ................... 429/16; 429/17; 429/19; 429/26
[58] Field of Search ................... 429/16, 17, 19, 26, 429/13, 20; 60/39.75

[56] References Cited

U.S. PATENT DOCUMENTS 3,976,506 8/1976 Landau ................... 429/19 X
3,982,962 9/1976 Bloomfield ................... 429/19
4,622,275 11/1986 Noguchi et al. ................... 429/19

Primary Examiner—Anthony Skapars
Attorney, Agent, or Firm—Antonelli, Terry & Wands

[57] ABSTRACT

An integrated power plant based on a molten carbonate type fuel cell and a gas turbine combined plant comprising a gas turbine, a steam turbine and a common generator driven by the gas turbine and the steam turbine is disclosed, where a reformer for a fuel gas to the anode of the fuel cell is heated through heat exchange with the cathode off-gas from the fuel cell to obtain the necessary heat for the reforming, and a portion of the anode off-gas from the fuel cell is combusted in a separate burner to form a $CO_2$ recycle to the cathode, while most of the remaining anode off-gas is supplied to the gas turbine combustor. The existing gas turbine combined plant can be used, as it is, without any substantial modification, and the present fuel cell power generation plant can be simply added thereto as an auxiliary unit.

14 Claims, 5 Drawing Sheets

THE INVENTION

THE INVENTION

THE INVENTION

THE INVENTION

INTEGRATED POWER PLANT AND METHOD FOR OPERATING THE PLANT

BACKGROUND OF THE INVENTION

This invention relates to an integrated power plant comprising a molten carbonate type fuel cell using a carbonate such as sodium carbonate, potassium carbonate, etc. in a molten state as an electrolyte, a gas turbine-generator and a steam turbine generator, and a method for operating the plant.

A fuel cell using a carbonate such as sodium carbonate, potassium carbonate, etc. in a molten state at 600° to 700° C. is called a molten carbonate type fuel cell. The molten carbonate type fuel cell is operated at such a high temperature that the reaction proceeds actively and no expensive catalyst such as platinum, etc. is required. In the molten carbonate type fuel cell, a hydrogen gas or a hydrogen-containing gas is supplied to the anode as a fuel gas, and a mixture of air and carbon dioxide gas is supplied to the cathode. The air and carbon dioxide gas receive electrons at the cathode and enters into the electrolyte in the form of carbonate ions. On the other hand, hydrogen reacts with the carbonate ions in the electrolyte at the anode to form a carbon dioxide gas and water and emit electrons. As a result, the molten carbonate type fuel cell consumes the carbon dioxide gas at the cathode, and produces the carbon dioxide gas and water at the anode. Thus, in the molten carbonate type fuel cell, when a utilization ratio of fuel gas (amount of fuel gas actually consumed at the anode/amount of fuel gas supplied to the anode) is increased, the fuel gas is diluted with the carbon dioxide gas and the water formed at the anode. At the same time, the consumption of fuel gas proceeds owing to the reaction in the cell, and thus the concentrations of the components taking part in the reaction of the fuel gas are considerably reduced, thereby lowering the output voltage of the fuel cell at a given current density and thus lowering the thermal efficiency. That is, with increasing utilization ratio of a fuel gas, a net fuel cell efficiency is lowered. The net fuel cell efficiency is defined by [cell output (kW)×860]/(heat of reaction of fuel gas actually consumed at the anode), and thus the fuel gas efficiency of fuel cell is lowered with increasing utilization ratio of fuel gas.

A nominal fuel cell efficiency is defined by [cell output (kW)×860]/(heat of reaction of fuel gas supplied to the anode) and can be obtained as (net fuel cell efficiency)×(utilization ratio of fuel gas). Thus, in order to increase the thermal efficiency of a fuel cell power plant, it is necessary to develop a fuel cell proper with less reduction in net fuel cell efficiency against increasing utilization ratio of fuel gas and to develop an integrated power plant with a higher thermal efficiency based on a higher overall heat recovery against a low utilization ratio of a fuel gas in the fuel cell.

It is known that the thermal efficiency of a fuel cell is increased with increasing pressure of a fuel gas. A fuel gas to the anode now widely used is a reformed gas composed mainly of hydrogen and carbon monoxide, obtained by reforming a natural gas under a pressure of 6 to 10 kg/cm$^2$ in a reformer, followed by heating to about 600° C. through a heat exchanger.

A gas turbine combined plant (gas turbine +steam turbine) now practically used has an arrangement shown in FIG. 1.

A gas turbine 29 is composed of a compressor 30, a combustor 32 and a turbine 31, where atmospheric air 23 is compressed by the compressor 30 and a fuel gas 1 is combusted together with the compressed air in the combustor 32. The combustion gas is led to the turbine 31 to convert the thermal energy to a mechanical energy which drives a generator 33 to generate electric power. The temperature of the combustion gas at the inlet of the turbine 31, now practically used, is as high as 1,000°–1,100° C., and consequently the exhaust gas 24 from the turbine 31 has a temperature as high as 500°–550° C., and thus can be utilized to generate steam 26 in a waste heat recovery boiler 36 and then vented to the atmosphere as a vent gas 25 having a thoroughly low temperature. The pressure of steam 26 can be selected to optimize the steam cycle, and usually ranges in 40–70 kg/cm$^2$. The steam 26 is fed to a steam turbine to drive the generator 33 common to the gas turbine 29 to generate electric power.

The effluent steam from the steam turbine 34 is cooled in a condenser 35 with cooling water such as sea water, etc. and fed to the waste heat recovery boiler 36 as boiler feed water 27 to form a circulating system.

In FIG. 1, an example that the steam turbine 34 and the gas turbine 29 drive the common generator 33 to generate electric power is shown, but the steam turbine 34 and the gas turbine 29 can drive their own individual generators. Steam 28 bled from the steam turbine 34 is injected into the combustor 32 for abating the amount of NO$_X$, and can be generally injected up to about twice the flow rate of the fuel gas 4. The fuel gas 4 at the ordinary temperature is supplied to the combustor 32 and combusted at a temperature of 1,000° to 1,100° C. In the country having a severe environmental control over NO$_X$, a NO$_X$ removal means is provided in the waste heat recovery boiler 36.

In the conventional integrated power plant using a fuel cell, a cathode off-gas is proposed to be used as a turbine driving gas, but the temperature of a cathode off-gas is 700° to 750° C., which is lower than that of the gas supplied to the turbine now used and lowers the thermal efficiency of the turbine. Furthermore, the temperature of turbine off-gas is as low as 300°–400° C., and the steam generated in the waste heat recovery boiler with such turbine off-gas is not enough for driving the steam turbine.

Japanese Patent Application Kokai (Laid-open) No. 61-39459 discloses that a combustor is provided in a conduit for leading a cathode off-gas to an expansion turbine in a turbo-charger for compressing and supplying air to the cathode of a fuel cell, and a portion of anode off-gas is led to the combustor and combusted together with the cathode off-gas as a combustion air. The combustion gas at a higher temperature from the cumbustor is led to the expansion turbine, thereby increasing the overall plant thermal efficiency. In this molten carbonate type fuel cell, it is necessary to recycle CO$_2$ to the cathode, and a portion of the said combustion gas is separated, compressed and added to the air to the cathode.

Japanese Patent Publication No. 58-56231 discloses a power plant using a phosphoric acid type fuel cell, where unreacted fuel component in the anode off-gas from the fuel cell is combusted in a reformer burner to supply a portion of the necessary heat for reforming the fuel gas and also to utilize the resulting combustion gas as a thermal energy to drive an expansion turbine of the turbo-charger, thereby driving a compressor of the turbo-charger for supplying air to the cathode of the fuel cell. That is, the air compressed by the compressor of the turbo-charger is supplied to the cathode of the fuel cell and the reformer burner, and the burner combustion gas and the cathode off-gas are led to the expansion turbine of the turbo-charger to recover the power for driving the compressor of the turbo-charger.

In the foregoing art, the chemical energy of a fuel gas is converted to an electric energy as much as possible in the fuel gas, and the fuel component in the anode off-gas of the fuel cell is utilized in the combustion in the reformer burner or the $CO_2$ formation recycle and ultimately in the power recovery of the air compressor of the turbo-charger for supplying air to the cathode of the fuel cell by driving the expansion turbine and in cooling the cathode of the fuel cell by the air, or also in electric power generation, if necessary. In this case, the power generation by the expansion turbine is auxiliary and its power ratio to the electric power generated by the fuel cell proper is only a few to ten-odd percent.

When the scale of a power plant based on a fuel cell is small, the capacity of expansion turbine-generator is relatively very small, and the scale merit as a rotor cannot be utilized and the mechanical loss becomes larger. Thus, the provision of expansion turbine-generator is not economically effective. In other words, a power plant will generally become a type of relatively low effect using only a turbo-charger.

As a means for increasing the power recovery in the expansion turbine relatively to the power of a fuel cell, the temperature and pressure of a gas to the expansion turbine are increased or additional combustion of a fuel by providing an auxiliary burner and supply of the combustion gas to the expansion turbine have been proposed, as described above, but the temperature and the pressure of the gas to the expansion turbine depend upon the operating temperature and pressure of the fuel cell proper and thus new tasks for development are imposed on the fuel cell proper. The addition of the auxiliary burner requires a new technical development for combusting the anode off-gas of low calorific level with the cathode off-gas of low oxygen content at a high combustion temperature.

Thus, in the conventional art the fuel cell takes a large part in the power ratio of power plant, and when the fuel cell based on the power recovery by a turbo-charger is limited to a small power generation, the power generation is carried out only by the fuel cell. That is, the power plant output and the efficiency are entirely dependent on the fuel cell. In other words, no consideration is paid to reduction in the power ratio of the fuel cell in an integrated power plant and to the consequent reduction in the risk of the fuel cell as a product still under development, and also to needs for increasing the overall thermal efficiency of the plant over that of the conventional power plant. The risk due to the reliability of the fuel cell proper has been a large problem that will become a risk on the total plant investment.

SUMMARY OF THE INVENTION

An object of the present invention is to provide an integrated power plant based on a molten carbonate type fuel cell and a gas turbine combined plant comprising a gas turbine, a steam turbine and a common generator driven by the gas turbine and the steam turbine, and a method for operating the integrated power plant, where a reformer for a fuel gas to the anode of the fuel cell is heated through heat exchange with the cathode off-gas from the fuel cell to obtain the necessary heat for the reforming, and a portion of the anode off-gas from the fuel cell is combusted in a separate burner to form a $CO_2$ recycle to the cathode, while most of the remaining anode off-gas is supplied to the gas turbine combustor. The cathode off-gas is subjected to heat recovery in the reformer, and thus the power recovery only for driving a compressor of turbo-charger is carried out by an expansion turbine of turbo-charger.

According to the present invention, the existing gas turbine combined plant can be used, as it is, without any substantial modification and thus the present fuel cell power generation plant can be added thereto as an auxiliary unit, where the output power of the gas turbine combined plant can be maintained at the same level as so far by making the utilization of fuel gas in the fuel cell lower than that of the conventional fuel cell power plant.

Another object of the present invention is to provide a integrated power plant and a method for operating the plant, where a power ratio of the fuel cell in the integrated power plant is made lower than that in the conventional power plant, and the overall thermal efficiency is made higher than that of the conventional power plant.

The said objects of the present invention can be attained by an integrated power plant comprising a gas turbine-generator and a fuel cell where a fuel gas is supplied to the anode of the fuel cell through a reformer, and the anode off-gas is combusted in a gas turbine combustor, thereby producing a combustion gas at a higher temperature than the operating temperature of the fuel cell, and driving the gas turbine with the combustion gas, while discharging the cathode off-gas to the outside of the plant, or by an integrated power plant comprising a gas turbine-steam turbine-generator and a fuel cell, where a fuel gas is supplied to the anode of the fuel cell through a reformer, and the anode off-gas is combusted in a gas turbine combustor, thereby producing a combustion gas at a higher temperature than the operating temperature of the fuel cell, driving the gas turbine with the combustion gas, while discharging the cathode off-gas to the outside of the plant, supplying the combustion gas from the gas turbine to a waste heat recovery boiler, thereby generating steam at a high temperature and a high pressure, and feeding the steam to the steam turbine, thereby driving the steam turbine.

In the present invention, a portion of the calorific value of a fuel gas on a high calorific level such as methane, etc. for a combined power plant of a gas turbine or a gas turbine and a steam turbine is converted to electric power at the anode of a fuel cell, and then the anode off-gas is used as a fuel gas on intermediate or low calorific level for driving the gas turbine after combustion in the gas turbine combustor.

With the recent development of gas turbine technology, gas turbine combustion temperature is elevated in order to increase the power generation efficiency, and now large scale, gas turbine combined power plants operating at a combustion temperature of 1,100° C. are practically employed. The gas turbine combustion temperature still tends to increase in the future. At the gas turbine combustion temperature of 1,100° C., the gas turbine exhaust gas has a temperature of 500° to 600° C., and thus is led to a waste heat recovery boiler to recover the sensible heat of the gas turbine exhaust gas and drive a steam turbine. Combined power plants provided with such a waste heat recovery boiler and a steam turbine have been practically employed.

The calorific value of a fuel gas, for example, methane, etc. is as high as 10,000–13,000 Kcal/kg, and a gas turbine combustor destined for combustion of such a high calorific level fuel gas can serve a stable combustion even of a fuel gas on an intermediate calorific level such as 2,500–3,000 Kcal/kg. Generally, a fuel gas for a molten carbonate type fuel cell is a gas composed mainly of hydrogen and carbon monoxide, which can be obtained by reforming methane, etc. through reaction with steam in a reformer with heating. Methane having a calorific value of 10,000 to 13,000 Kcal/kg is changed to a reformed gas having a calorific value of 3,500 to 4,000 Kcal/kg in the reformer as a result of an increase in the calorific value by the endothermic reaction and a decrease by the addition of steam thereto. Thus, a portion of the calorific value of 3,500 to 4,000 Kcal/kg possessed by the fuel gas after the reforming and generation of hydrogen owing to the steam shift conversion taking place in the fuel cell can be both available as the electrochemical reaction. That is, at least about 1,000 Kcal/kg, a difference between 3,500–4,000 Kcal/kg and 2,500–3,000 Kcal/kg, can be utilized in the fuel cell, which corresponds to 20–30% of gross calorific value of the initial methane fuel gas after the adjustment of relative decrease in the calorific value due to the steam addition.

In a fuel cell, the cell voltage at a given current density tends to decrease with increasing utilization ratio of a fuel gas, as already described before. That is, the power output is increased, but the net fuel efficiency is lowered. This fact is known from the characteristics of a fuel cell that the fuel cell can attain a high thermal efficiency under a partial load. In other words, operation of a fuel cell with a low utilization ratio of a fuel gas is effective for reducing the thermal loss of the fuel cell and can lower the the capacity for supplying the fuel cell cathode air, which also serves the cooling of the fuel cell. That is, it is enough to provide a turbo-charger of small capacity solely destined for supplying the fuel cell cathode air. In that case, the compressor of the turbo-charger can be driven by the power recovered by the expansion turbine of the turbo-charger by leading the cathode off-gas thereto after heat exchange of a fuel gas with the cathode off-gas in the heating section of the reformer.

PREFERRED EMBODIMENTS OF THE INVENTION

Figure 2:
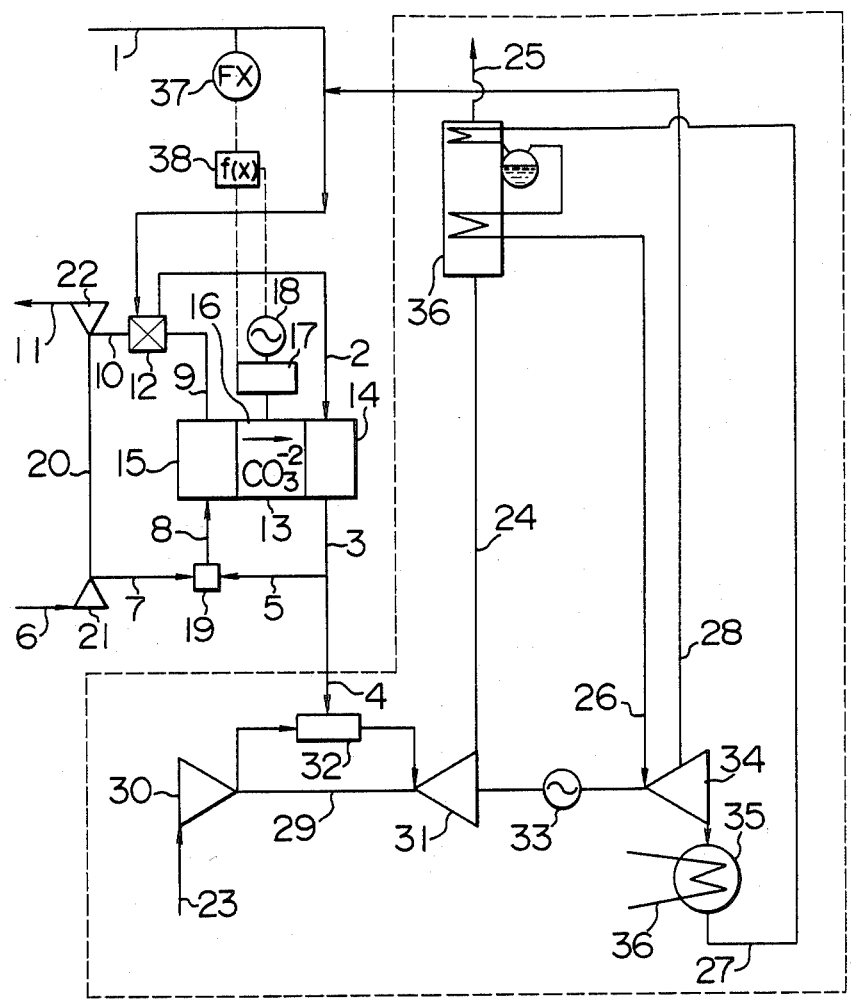
FIG. 2 is a schematic flow diagram of an integrated power plant using a fuel cell according to one embodiment of the present invention.

In FIG. 2, a first embodiment of the present invention is schematically shown.

A power generation system is composed of an integrated power cycle of a fuel cell power system and a gas turbine combined power system.

The fuel cell power system comprises a reformer 12, a fuel cell 13 and a turbo-charger 20 as main members, and the DC power generated by the fuel cell 13 is converted to an AC power through an inverter 17 as a power output.

Figure 1:
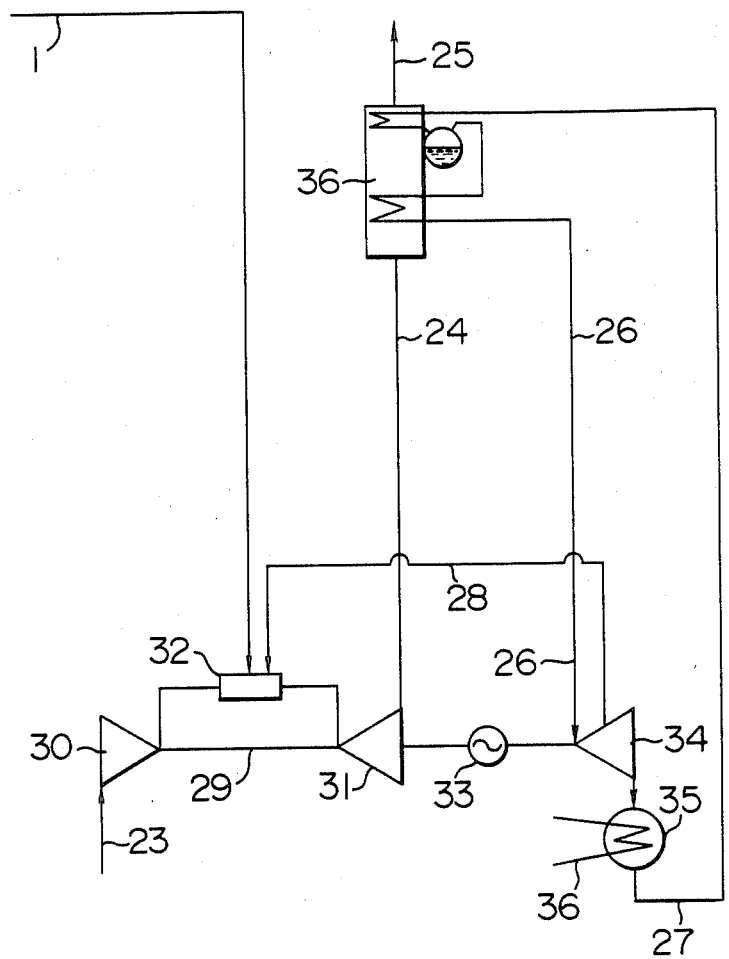
FIG. 1 is a schematic flow diagram of a gas turbine combined plant according to one prior art.

The gas turbine combined power system shown as encircled by dotted line in FIG. 2 has the same structure as shown in FIG. 1 and comprises a gas turbine 29, a steam turbine 34 and a waste heat recovery boiler 36 as main members, and a power output is obtained through a generator 33 coupled with the gas turbine 29 and the steam turbine 34.

The structure and function of the fuel cell power system will be described below.

Fuel gas 1, for example, methane ($CH_4$), etc. is led to a reformer 21 as mixed with or separately from steam 28 bled from the steam turbine 34, and subjected to steam reforming reaction to form a cell fuel gas 2 composed mainly of hydrogen and carbon monoxide according to the following reaction equation:

Steam reforming reaction: $CH_4 + H_2O \rightarrow 3H_2 + CO$

Conversion of the fuel gas in the reformer 12 depends upon the reforming reaction temperature, and in order to obtain a conversion of 80 to 90% for the ordinary fuel cell power plant, the reforming reaction temperature is usually as high as 800°–850° C. To this end, it is usual to conduct combustion reaction in the reformer to supply the necessary heat and temperature for the steam reforming reaction. However, in the present invention, the chemical energy in the fuel gas to be utilized in the fuel cell 13 corresponds to maximum 20–30% of the calorific value possessed by the initial fuel gas such as methane, etc., and thus the conversion of 20 to 50% is enough for the reforming reaction. That is, this conversion can be obtained at a reforming reaction temperature of 500°–700° C. In other words, the sensible heat of the cathode off-gas 9, for example, at about 700° C. can be utilized for heating the reformer 12, and neither a burner nor additional supply of fuel is required for the reformer 12. Thus, the fuel cell power system can be economically simplified.

The fuel gas supplied to the anode 14 of the fuel cell undergoes electrochemical reaction with the air and carbon dioxide gas supplied to a cathode 15 through an electrolyte 16 to generate a DC power. In the electrochemical reaction, carbonate ions ($CO_3^{-2}$) migrate from the cathode 15 to the anode 14 through the electrolyte 16, and steam is formed at the anode 14 according to the following reaction formulae:

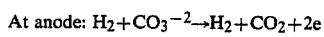

At anode: $H_2 + CO_3^{-2} \rightarrow H_2 + CO_2 + 2e$

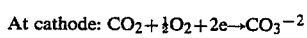

At cathode: $CO_2 + \frac{1}{2}O_2 + 2e \rightarrow CO_3^{-2}$

Anode off-gas 3 still has a necessary calorific value for combustion for the gas turbine 31, for example, 2,500 to 3,000 Kcal/kg, and is supplied as a fuel gas 4 to a gas turbine combustor 32.

As the air to the fuel cell cathode 15, atmospheric air 6 is compressed by an air compressor 21 of a turbo-charger 20, then subjected to combustion of a portion of the anode off-gas 3 as a recycle gas 5 in a burner 19, and supplied to the cathode as a cathode feed gas 8 containing carbon dioxide. A portion of carbon dioxide supplied to the cathode 15 migrates to the anode 14 in the form of carbonate ions ($CO_3^{-2}$).

The electrolyte 16 is a carbonate in a molten state generally at a temperature of 650°-700° C., and the anode off-gas 3 and the cathode off-gas 9 are both at a temperature of about 700° C. The sensible heat of the cathode off-gas 9 is utilized for heating the reformer 12 through heat exchange to supply the necessary heat for the reforming reaction and for heating the anode fuel gas 2, and then the cathode off-gas is led to the expansion turbine 22 as an inlet gas 10 to drive the expansion turbine 22 for power recovery for the air compressor 21, and discharged as a vent gas 11 at a low temperature and a low pressure.

The gas turbine combined power system has the same structure as the conventional combined power system shown in FIG. 1.

Reforming steam 28 is bled at the necessary pressure from the steam turbine 34. The gas turbine exhaust gas 24 is subjected to waste heat recovery in the waste heat recovery boiler 36 and then discharged to the atmosphere as a vent gas at a thoroughly low temperature.

In the gas turbine combustor 32, combustion is carried out at a high temperature, and in the case of combustion of a fuel gas on a high or intermediate calorific level, $NO_X$ is formed, and usually a means for abating $NO_X$ must be provided from the viewpoint of environmental pollution prevention. To this end, water or steam is usually injected into the gas turbine combustor. In the present integrated power system, the fuel gas 4 contains most of the steam used for the reforming reaction and most of the steam generated in the fuel cell 13, and thus more than the necessary amount of steam for abating $NO_X$ is contained in the fuel gas 4 than in the conventional gas turbine combined power system.

The anode off-gas 3 is substantially at the same temperature as the reaction temperature of the fuel cell 13, that is, at about 700° C., and its high sensible heat can contribute to saving of the calorific requirements for the fuel gas in spite of the low calorific value of the fuel gas 4 for the gas turbine combustor 32. That is, the performance and environmental pollution prevention equivalent to that of the now practically operating gas turbine combined power plant can be attained with the anode off-gas on an intermediate or low calorific level in the present invention. The utilization of the fuel gas in the fuel cell 13 can be simply controlled by inputting a control signal 38 to the inverter 17 to obtain a fuel cell power output 18 proportionally to the flow rate 37 of the fuel gas 1, so that the remaining calorific value of the anode off-gas as a fuel gas 4 for the gas turbine combustor 32 can have at least the necessary calorific value for the combustor 32. In this manner, the gas turbine combustor 32 can undergo stable combustion with the anode off-gas 3.

The unreacted fuel components in the anode off-gas are completely combusted in the gas turbine combustor 32, and thus can be effectively utilized. The necessary carbon dioxide recycle to the cathode 15 can be simply maintained by controlling the flow rate of the anode off-gas 5 to the burner 19 proportionally to the fuel cell power 18.

EXAMPLE 2

Figure 3:
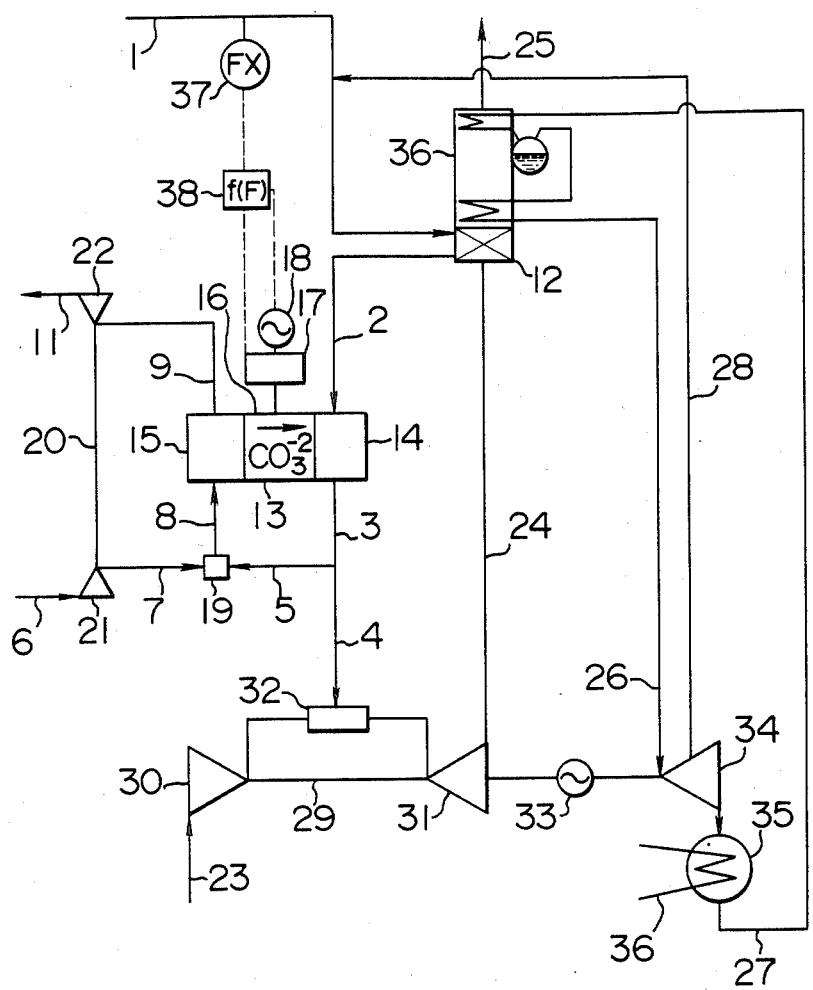
FIG. 3 is a schematic flow diagram of an integrated power plant using a fuel cell according to another embodiment of the present invention.

In FIG. 3, another embodiment of the present invention is shown. A single structural difference from the embodiment of FIG. 2 is that the reformer 12 is provided in or on the upstream side of the waste heat recovery boiler 36 to recover the sensible heat of the gas turbine exhaust gas 24. Since the gas turbine exhaust gas 24 is at 500°-550° C. which is lower than about 700° C. of the cathode off-gas 9, the reformer 12 is operated at a lower conversion. Thus, the utilization ratio of a fuel gas in the fuel cell 13 becomes lower, and consequently the turbo-charger 20 has a lower air capacity.

EXAMPLE 3

Figure 4:
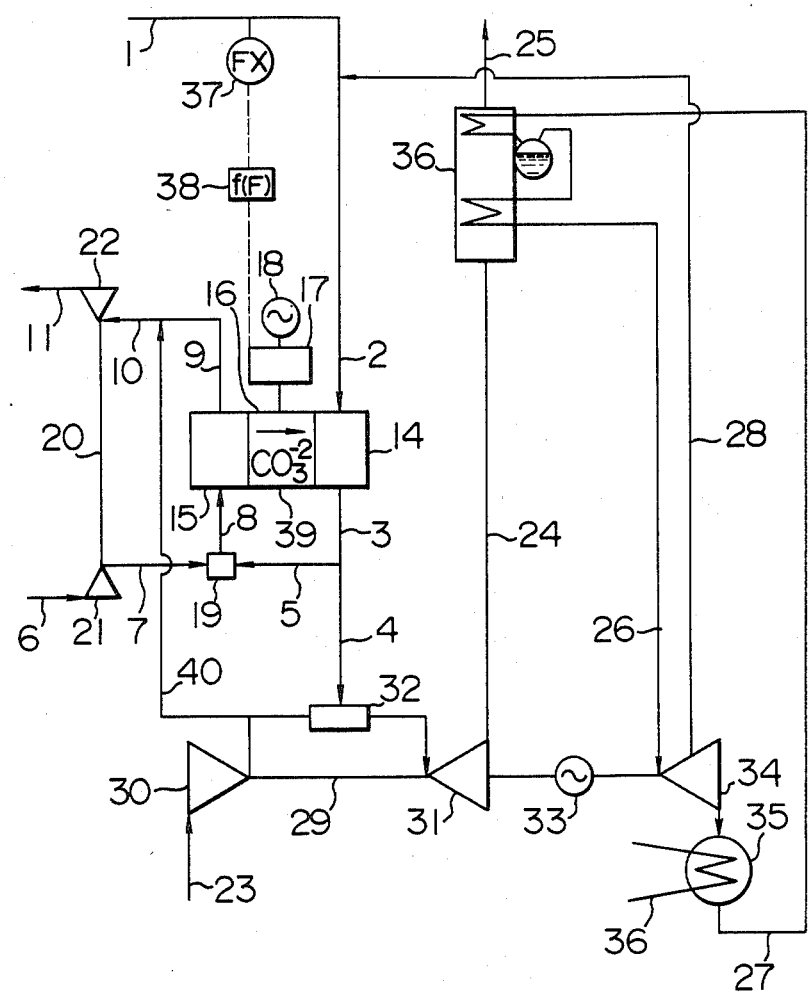
FIG. 4 is a schematic flow diagram of an integrated power plant using a fuel cell according to other embodiment of the present invention.

In FIG. 4, other embodiment of the present invention is shown. In the foregoing embodiments, the reformer 12 is provided outside the fuel cell 13, whereas in this embodiment a fuel cell 39 is of a reformer-integrated type, and thus no reformer is provided outside the fuel cell. The fuel gas 1 is mixed with steam 28 bled from the steam turbine 34 and then supplied to the fuel cell anode 14 as a fuel gas 2. In the fuel cell, both the reforming reaction and the electrochemical reaction are carried out. When the anode off-gas 3 and the cathode off-gas 9 have a temperature of about 700° C. from the heat balance between the endothermic reaction and the exothermic reaction, the flow rate of the cathode air 7 which also serve the cooling of the fuel cell is considerably reduced. When the cathode off-gas 9 is not enough to drive the expansion turbine 22 as the driving gas 10, air 40 bled from the compressor 30 in the gas turbine combined power system 29 is added to the driving gas 10 to recover the necessary power for driving the air compressor 21. The bleeding of air from the compressor can be made at the outlet or at any intermediate stage of the compressor in view of the required pressure.

According to the present invention, the thermal efficiency of the present integrated power plant using a fuel cell can be made higher in accordance with the power output from the fuel cell than the conventional gas turbine combined power plant.

Figure 5:
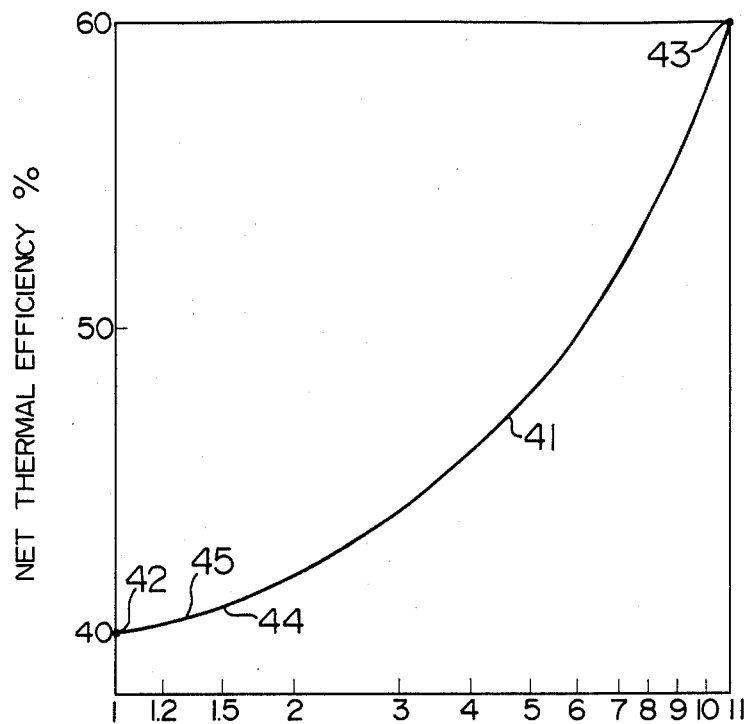
FIG. 5 is a diagram showing an effect of the present invention.

FIG. 5 conceptually shows the effect of the present invention on an increase in the thermal efficiency, where a gas turbine combined power plant having a net thermal efficiency of 40% is integrated with a molten carbonate type fuel cell. Even if the fuel cell shares a half of the power output of the integrated power plant, an increase of about 2% (relative value) in the net thermal efficiency can be obtained. When the fuel cell shares about 20% of the power output of the integrated power plant, an increase of about 1% (relative value) in the net thermal efficiency can be obtained. In the present invention, the gas turbine combined power plant takes a large share of the power output of the integrated power plant, an operational risk of the integrated power plant due to the reliability of the fuel cell can be reduced.

The power output ratio, which is a total of [the power output of the gas turbine combined power plant +the power output of the fuel cell (=the power output of the integrated power plant)]/(the power output of the gas turbine combined power plant) is given on a curve 41 ploting between the point 42 corresponding to the gas turbine combined power plant alone and the point 43 corresponding to the target integrated power plant based on the fuel cell having a utilization ratio of fuel gas of 80%, where the point 44 corresponding to the power output ratio of 1.5, where the fuel cell shares 50% of the power output of the integrated power plant and the point 45 corresponding to the power output ratio of 1.2, where the fuel cell shares 20% of the power output of the integrated power plant have the said increases in the net thermal efficiency.

What is claimed is:

1. An integrated power plant which comprises a gas turbine power plant composed of a compressor, a gas turbine combustor, a gas turbine and a generator, the compressor, the gas turbine and the generator being coaxially connected to one another, a fuel cell combined with a fuel gas reformer, a fuel gas conduit for supplying a fuel gas to the anode of the fuel cell being provided as connected to the anode through the fuel gas reformer, an anode off-gas conduit for leading an anode-off gas to the gas turbine combustor being provided between the anode and the gas turbine combustor, and a cathode off-gas conduit for discharging a cathode off-gas to the outside of the plant being provided at the cathode of the fuel cell.

2. An integrated power plant which comprises a gas turbine combined power plant composed of a compressor, a gas turbine combustor, a gas turbine, a steam turbine, a generator and a waste heat recovery boiler, the compressor, the gas turbine, the steam turbine and the generator being coaxially connected to one another, a fuel cell combined with a fuel gas reformer, a fuel gas conduit for supplying a fuel gas to the anode of the fuel cell being provided as connected to the anode through the fuel gas reformer, an anode off-gas conduit for leading an anode off-gas to the gas turbine combustor being provided between the anode and the gas turbine combustor, a cathode off-gas conduit for discharging a cathode off-gas to the outside of the plant being provided at the cathode of the fuel cell, a gas turbine exhaust gas conduit for leading a gas turbine exhaust gas to the waste heat recovery boiler being provided between the gas turbine outlet and the waste heat recovery boiler, and a steam conduit for leading steam generated at a high temperature and a high pressure in the boiler to the steam turbine, thereby driving the steam turbine being provided between the waste heat recovery boiler and the steam turbine.

3. An integrated power plant according to claim 1 or 2, wherein the fuel gas reformer is provided outside and separately from the fuel cell, and the heating section of the fuel gas reformer is connected to the cathode off-gas conduit, the heating section is heated with the cathode off-gas through heat exchange with the cathode gas before discharging to the outside of the plant, thereby elevating the reformer to a temperature necessary for reforming of the fuel gas.

4. An integrated power plant according to claim 1 or 2, wherein the fuel gas reformer is integrated with the anode of the fuel cell and provided within the fuel cell.

5. An integrated power plant according to claim 1 or 2, wherein a turbo-charger comprising an air compressor and an expansion turbine, as coaxially connected to each other, is provided, a compressed air conduit for leading a compressed air to the cathode of the fuel cell from the air compressor is provided between the air compressor and the cathode of the fuel cell, the cathode off-gas conduit is connected to the expansion turbine, and the expansion turbine is driven by the cathode off-gas to drive the air compressor and supply the compressed air to the cathode.

6. An integrated power plant according to claim 2, wherein the fuel gas reformer is provided outside and separately from the fuel cell and integrated with the waste heat recovery boiler, the heating section of the fuel gas reformer is connected to the gas turbine outlet and heated with the gas turbine exhaust gas, thereby heating the reformer to a temperature necessary for reforming the fuel gas, and the waste heat recovery boiler is heated with the reformer heating section off-gas.

7. An integrated power plant according to claim 1 or 2, wherein a control system for controlling power output of the fuel cell proportionately to a flow rate of a fuel gas upstream of the fuel cell is provided between a fuel gas conduit to the fuel cell and a power invertor of the fuel cell, thereby controlling a calorific value of the anode off-gas from the fuel cell at least to a necessary calorific value for the gas turbine combustor and stably combusting the anode off-gas in the gas turbine combustor.

8. An integrated power plant according to claim 1 or 2, wherein the fuel cell is a molten carbonate type fuel cell.

9. A method for operating an integrated power plant comprising a gas turbine power plant and a fuel cell, which comprises leading a fuel gas to the anode of the fuel cell through a fuel gas reformer, combusting an anode off-gas in a gas turbine combustor, thereby making the temperature of the resulting combustion gas higher than the operating temperature of the fuel cell, and driving a gas turbine with the combustion gas while discharging a cathode off-gas to the outside of the plant.

10. A method for operating an integrated power plant comprising a gas turbine power plant, a steam turbine plant and a fuel cell, which comprises leading a fuel gas to the anode of the fuel cell through a fuel gas reformer, combusting an anode off-gas in a gas turbine combustor, thereby making the temperature of the resulting combustion gas higher than the operating temperature of the fuel cell, driving a gas turbine with the combustion gas, leading a gas turbine exhaust gas to a waste heat recovery boiler, thereby generating steam at a high temperature and a high pressure in the waste heat recovery boiler, and leading the steam to a steam turbine, thereby driving the steam turbine, while discharging a cathode off-gas to the outside of the plant.

11. A method according to claim 9 or 10, wherein a turbo-charger composed of an air compressor and an expansion turbine is provided, the expansion turbine is driven by a cathode off-gas from the fuel cell to drive the air compressor, thereby supplying compressed air to the cathode.

12. A method according to claim 9 or 10, wherein the fuel gas reformer is provided outside the fuel cell, and the heating section of the reformer is heated with the cathode off-gas through heat exchange to a temperature necessary for reforming.

13. A method according to claim 10, wherein the reformer is provided outside the fuel cell and integrated with the waste heat recovery boiler, an exhaust gas from the gas turbine is lead to the heating section of the reformer, and then to the waste heat recovery boiler.

14. A method according to claim 9 or 10, wherein the power output of the fuel cell is controlled proportionately to a flow rate of a fuel gas upstream of the fuel cell, thereby making a calorific value of the anode off-gas at least a necessary calorific value for gas turbine combustion, and stably combusting the anode off-gas in the gas turbine.

* * * * *